United States Patent
Bernal et al.

(10) Patent No.: US 9,253,503 B2
(45) Date of Patent: Feb. 2, 2016

(54) COMPUTATIONALLY EFFICIENT MOTION ESTIMATION WITH LEARNING CAPABILITIES FOR VIDEO COMPRESSION IN TRANSPORTATION AND REGULARIZED ENVIRONMENTS

(71) Applicant: Xerox Corporation, Norwalk, CT (US)

(72) Inventors: Edgar A. Bernal, Webster, NY (US); Stuart A. Schweid, Pittsford, NY (US); Orhan Bulan, Greece, NY (US)

(73) Assignee: XEROX CORPORATION, Norwalk, CT (US)

( * ) Notice: Subject to any disclaimer, the term of this patent is extended or adjusted under 35 U.S.C. 154(b) by 581 days.

(21) Appl. No.: 13/718,030

(22) Filed: Dec. 18, 2012

(65) Prior Publication Data

US 2014/0169469 A1 Jun. 19, 2014

(51) Int. Cl.
 *H04N 19/513* (2014.01)
 *H04N 19/57* (2014.01)

(52) U.S. Cl.
 CPC ............. *H04N 19/521* (2014.11); *H04N 19/57* (2014.11)

(58) Field of Classification Search
 CPC .............................. H04N 19/521; H04N 19/57
 See application file for complete search history.

(56) References Cited

U.S. PATENT DOCUMENTS

| | | | |
|---|---|---|---|
| 6,081,209 A | | 6/2000 | Schuyler et al. |
| 6,493,042 B1* | | 12/2002 | Bozdagi et al. ............... 348/700 |
| 2002/0072847 A1 | | 6/2002 | Trajkovic et al. |
| 2006/0188019 A1* | | 8/2006 | Lin .......................... 375/240.16 |
| 2006/0228049 A1* | | 10/2006 | Gensolen et al. ............. 382/309 |
| 2007/0183497 A1* | | 8/2007 | Luo et al. ................. 375/240.12 |
| 2007/0291843 A1* | | 12/2007 | Chappalli et al. ........ 375/240.16 |

OTHER PUBLICATIONS

Y. Lin et al., "Fast Full-Search Block-Matching Algorithm for Motion-Compensated Video Compression" IEEE Trans. on Comm., vol. 45, No. 5, May 1997, pp. 527-531.
C. Kuo et al., "A Novel Prediction-Based Directional Asymmetric Search Algorithm for Fast Block-Matching Motion Estimation" IEEE Trans. on Circuits and Systems for Video Technology, vol. 19, No. 6, Jun. 2009, pp. 893-899.
T. Liang et al., "Adaptively Asymmetric Pattern Search for Fast Block-Matching Motion Estimation" Proc. of the 7th IEEE Int. Symposium on Multimedia, 2005, 7 pgs.
I. McQuirk et al., "Estimating the Focus of Expansion in Analog VLSI" Int. Journal of Computer Vision, vol. 28(3), 1998, 17 pgs.

(Continued)

*Primary Examiner* — Sath V Perungavoor
*Assistant Examiner* — Peter D Le
(74) *Attorney, Agent, or Firm* — Fay Sharpe LLP

(57) ABSTRACT

The method facilitates efficient motion estimation for video sequences captured with a stationary camera with respect to an object. For video captured with this type of camera, a main cause of changes between adjacent frames corresponds to object motion. In this setting the output from the motion compensation stage is the block matching algorithm describing the way pixel blocks move between adjacent frames. For video captured with cameras mounted on moving vehicles (e.g. school buses, public transportation vehicles and police cars), the motion of the vehicle itself is the largest source of apparent motion in the captured video. In both cases, the encoded set of motion vectors is a good descriptor of apparent motion of objects within the field of view of the camera.

26 Claims, 12 Drawing Sheets

(56) References Cited

OTHER PUBLICATIONS

C. Beal et al., "High-Definition Video over IP: Enhancing Visual Information for Improved Traffic Flow and Incident Response" Cohu Inc. in conjunction with Theresa Myers, Editor, Activu Corporation, 2010, 4 pgs.

T. Wiegand et al., "Overview of the H.264 / AVC Video Coding Standard" IEEE Trans. on Circuits and Systems for Video Technology, Jul. 2003, pp. 1-19.

G. Bailo et al., "Search Window Estimation Algorithm for Fast and Efficient H.264 Video Coding With Variable Size Block Configuration" Department of Biophysical and Electronic Engineering University of Genova, 4 pgs.

M. Sarwer et al., "An Efficient Search Range Decision Algorithm for Motion Estimation in H.264/AVC" International Journal of Circuits, Systems and Signal Processing, Issue 4, vol. 3, 2009, pp. 173-180.

G. Bailo et al., "Search Window Size Decision for Motion Estimation Algorithm in H.264 Video Coder" 2004 International Conference on Image Processing, pp. 1453-1456.

\* cited by examiner

COMPUTATIONALLY EFFICIENT MOTION ESTIMATION WITH LEARNING CAPABILITIES FOR VIDEO COMPRESSION IN TRANSPORTATION AND REGULARIZED ENVIRONMENTS

TECHNICAL FIELD

The presently disclosed embodiments are directed toward efficient motion compensation using video motion vector information within the process of video compression. However, it is to be appreciated that the present exemplary embodiments are also amenable to other like applications.

BACKGROUND

Block-based motion estimation is an important element in many video coding standards that aims at removing temporal redundancy between neighboring frames. Traditional methods for block-based motion estimation such as the Exhaustive Block Matching Algorithm (EBMA) are capable of achieving good matching performance but are computationally expensive. Alternatives to EBMA have been proposed to reduce the amount of search points by trading off matching optimality with computational resources. Although they exploit shared local spatial characteristics around the target block, they fail to take advantage of the spatio-temporal characteristics of the video data itself. Spatio-temporal characteristics of the video provide useful information that can reduce the computational load incurred by block-matching algorithms in cameras (e.g., mounted cameras for traffic monitoring in highways) where motion characteristics of objects have trending patterns across time.

Video compression is employed in applications where high quality video transmission and/or archival is required. For example, a surveillance system typically includes a set of cameras that relay video data to a central processing and archival facility. While the communication network used to transport the video stream between the cameras and the central facility may be built on top of proprietary technology, traffic management centers have recently started to migrate to Internet Protocol- or IP-compliant networks. In either case, the underlying communication network typically has bandwidth constraints which dictate the use of video compression techniques on the camera end, prior to transmission. In the case of legacy analog cameras, compression is performed at an external encoder attached to the camera, whereas digital or IP cameras typically integrate the encoder within the camera itself. Typical transmission rates over IP networks require the frame rate of multi-megapixel video streams to be limited to fewer than 5 frames per second (fps). The latest video compression standards enable the utilization of the full frame rate camera capabilities for transmitting high definition video at the same network bandwidth. For example, transmission of 1080 p HD uncompressed video requires a bandwidth of 1.5 Gbps, while its compressed counterpart requires only 250 Mbps; consequently, transmission of compressed video with at least 6 times the frame rate of the uncompressed version would be possible over the same network infrastructure.

Video compression is achieved by exploiting two types of redundancies within the video stream: spatial redundancies amongst neighboring pixels within a frame, and temporal redundancies between adjacent frames. This modus operandi gives raise to two different types of prediction, namely intra-frame and inter-frame prediction, which in turn result in two different types of encoded frames, reference and non-reference frames. Reference frames, or "I-frames" are encoded in a standalone manner (intra-frame) using compression methods similar to those used to compress digital images. Compression of non-reference frames (e.g., P-frames and B-frames) entails using inter-frame or motion-compensated prediction methods where the target frame is estimated or predicted from previously encoded frames in a process that typically entails three steps: (i) motion estimation, where motion vectors are estimated using previously encoded frames. The target frame is segmented into pixel blocks called target blocks, and an estimated or predicted frame is built by stitching together the blocks from previously encoded frames that best match the target blocks. Motion vectors describe the relative displacement between the location of the original blocks in the reference frames and their location in the predicted frame. While motion compensation of P-frames relies only on previous frames, previous and future frames are typically used to predict B-frames; (ii) residual calculation, where the error between the predicted and target frame is calculated; and (iii) compression, where the error residual and the extracted motion vectors are compressed and stored. Throughout the teachings herein, the terms "motion vector" and "compression-type motion vector" are used synonymously.

There is a need in the art for systems and methods that facilitate block-based motion estimation that are both computationally efficient and capable of exploiting the dominant spatio-temporal characteristics of the motion patterns captured in the video, without sacrificing matching performance relative to exhaustive methods, while overcoming the aforementioned deficiencies.

BRIEF DESCRIPTION

In one aspect, a computer-implemented method for performing motion estimation to compress video frames using at least one optimized search neighborhood, comprises segmenting a target frame into target pixel blocks, determining whether each of the one or more target blocks is a candidate for efficient motion compensation, and for those target blocks deemed to be candidates for efficient motion block estimation, optimizing the search neighborhood and performing a block matching search on the optimized search neighborhood.

In another aspect, a system that facilitates estimating motion for compression of video frames using at least one optimized search neighborhood comprises a camera that captures video of a moving object, and a processor configured to segment a target frame into target pixel blocks, determine whether each of the one or more target blocks is a candidate for efficient motion compensation, and, for those target blocks deemed to be candidates for efficient motion block estimation, optimizing the search neighborhood and performing a block-matching search on the optimized search neighborhood.

In yet another aspect, a non-transitory computer-readable medium stores computer-executable instructions for performing motion estimation for compression of video frames using at least one optimized search neighborhood, the instructions comprising segmenting a target frame into target pixel blocks, determining whether each of the one or more target blocks is a candidate for efficient motion compensation, and, for those target blocks deemed to be candidates for efficient motion block estimation, optimizing the search neighborhood and performing a block-matching search on the optimized search neighborhood.

DETAILED DESCRIPTION

The above-described problem is solved by performing block-based motion estimation for video compression that is capable of learning the dominant spatio-temporal characteristics of the motion vector patterns within the scene being captured. It is particularly well suited for stationary traffic cameras that monitor roads and highways for traffic law enforcement purposes, as well as for vehicle-mounted cameras (e.g. cameras mounted on school buses, public transportation vehicles and police cars). It relies on learning predominant motion characteristics of objects within the field of view of the camera and reduces the block-matching search space by adaptively changing the search neighborhood size and orientation based on the learned historical motion characteristics of the video. Alternatively, the predominant motion characteristics can be manually input by a camera operator. The learning approach includes a motion-learning phase that builds global and block-based histograms of historical motion behavior, and a block-based motion estimation phase that performs searches in reduced or optimized neighborhoods of the target block according to the learnt historical motion behavior patterns. Learning the historical patterns of behavior of global and local motion vectors enables the described algorithm to achieve considerable savings in computation at a reduced cost in matching performance with respect to multi-stage block-matching algorithms. Predominant motion characteristics can also be input manually by an operator during camera installation, maintenance or monitoring.

Figure 1:
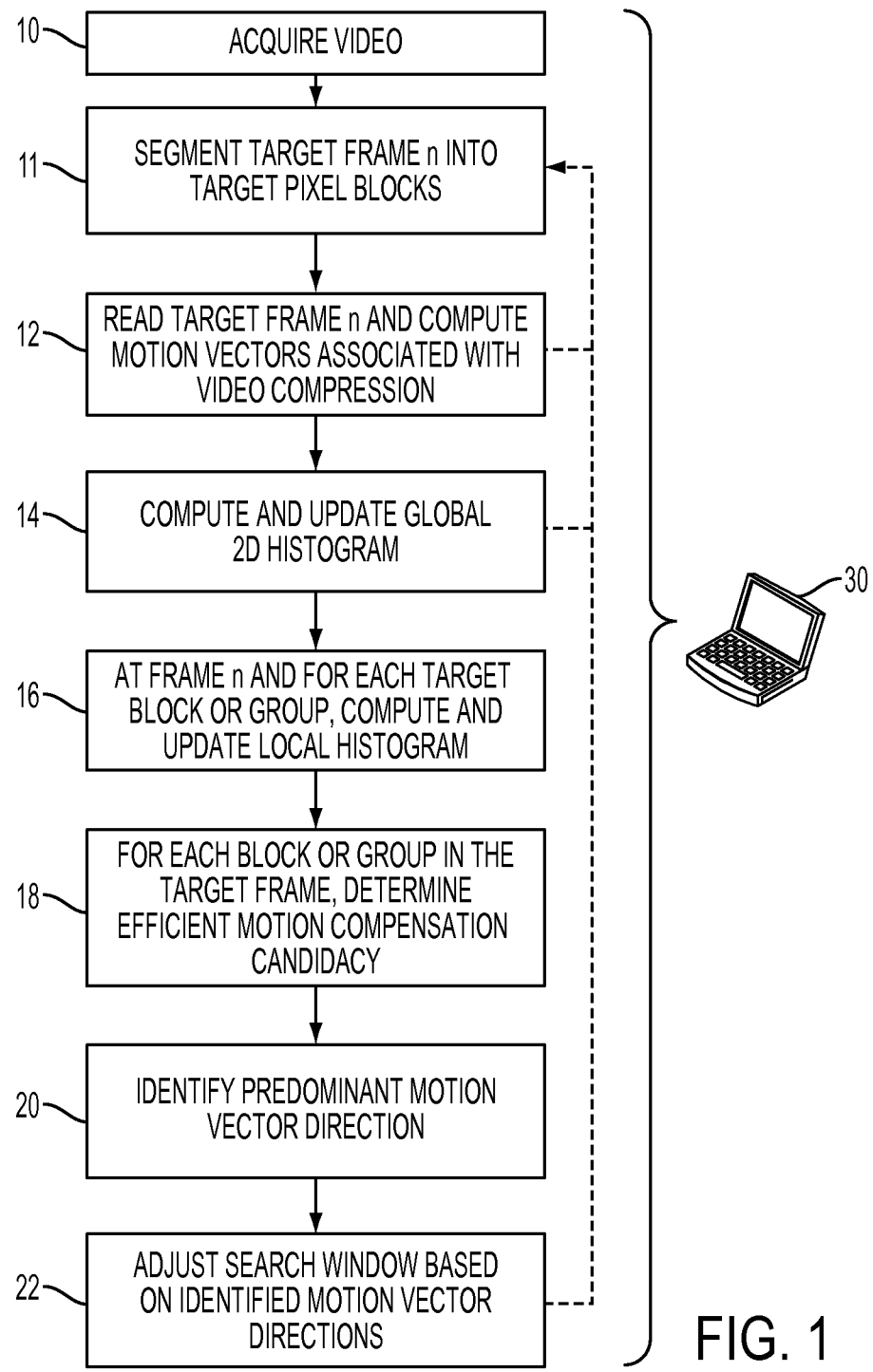
FIG. 1 illustrates a method for performing block-based motion estimation for video compression and learning the dominant spatio-temporal characteristics of the motion patterns within the scene being captured, in accordance with one or more features described herein.

FIG. 1 illustrates a method for performing block-based motion estimation for video compression and learning the dominant spatio-temporal characteristics of the motion patterns within the scene being captured, in accordance with one or more features described herein. At 10, video is acquired using, for example, a traffic surveillance camera (e.g., a stationary camera, a camera mounted on a vehicle, or any other suitable camera). For instance, a conventional traffic camera or other video camera may be used for capturing live video. Additionally or alternatively Internet protocol (IP) cameras may also be employed, which perform embedded video compression prior to transmission. Alternatively, the compressed video may be available from a video database where video sequences from surveillance cameras are stored.

At 11, a target frame n is segmented into a plurality of target pixel blocks. At 12, the target frame n is read and motion vectors associated with the compression of the frame (if non-reference) are determined or computed via traditional motion estimation algorithms. At 14, a global 2D histogram $H_n(dx, dy)$ of motion vector components is updated along the horizontal (dx) and vertical (dy) directions based on $H_{n-1}(dx,dy)$ and the histogram at frame n, $h_n(dx,dy)$ via an auto-regressive moving average computation such that:

$$H_n(dx,dy)=\alpha h_n(dx,dy)+(1-\alpha)H_{n-1}(dx,dy)$$

where $\alpha$ is a constant such that $0 \leq \alpha \leq 1$. When $h_n(dx,dy)$ is smooth (thus indicating the absence of predominant motion patterns in the scene), $\alpha$ can be set to 0 so as to exclude frames when no motion is observed in the scene from histogram calculation. If the histogram is mostly uniform, the method reverts to 11 and a next frame is segmented, otherwise the method proceeds to 16. Step 14 is a preprocessing step for the next level where the histograms for local regions are calculated.

At 16, at frame n and for every target block (or target block group) k, a local 2D histogram $H_{nk}(dx,dy)$ of the motion vector components dx and dy based on $H_{n-1k}(dx,dy)$ and $h_{nk}(dx,dy)$ is updated via an auto-regressive moving average computation such that:

$$H_{nk}(dx,dy)=\alpha h_{nk}(dx,dy)+(1-\alpha)H_{n-1k}(dx,dy)$$

where $\alpha$ is a constant such that $0 \leq \alpha \leq 1$. If $n \geq N$ where N is a predetermined threshold that determines the length of the learning period, and the histogram is clustered, a block (or block group) k is labeled as a candidate for efficient motion compensation, and the method reverts to 11 for additional frame analysis until all or a subset of all frames have been analyzed. It will be appreciated that in other embodiments, candidacy for efficient motion compensation may be determined manually and/or via a priori labeling of candidate target blocks.

The efficient motion estimation phase begins at 18, where, for every block (or block group) in the target frame, a determination is made whether the block or block group is a candidate for efficient motion compensation from the labels assigned by the learning stage (steps 11, 12, 14, 16). If not, then a traditional block matching algorithm can be performed and, optionally, histogram monitoring can be continued to detect a presence of predominant motion characteristics. In one example, initial search neighborhood attributes (e.g., size, orientation, etc.) are learned or computed as a function of the determined predominant motion vector directions. In another example initial search neighborhood attributes are manually input by an operator or technician. If the block or block group is a candidate for efficient motion compensation, then at 20 the local 2D histogram of motion vector components of the target block (or block group) processed and predominant motion vector directions are determined. Search neighborhood size and orientation (e.g., search direction) is modified to perform block matching only along predominant directions, at 22. That is, a block-matching search is executed on a modified or optimized search neighborhood, such that for a candidate block, a search for a matching block in subsequent video frames is performed along the determined predominant motion vector directions and magnitudes. The method then reverts to 11 for subsequent iteration on a new frame.

In another embodiment, block labels can be assigned by a camera operator by segmenting regions with dominant motion characteristics (e.g. highway lanes, road shoulders, areas on the side of the road) from those without such characteristics (e.g. sidewalks with unstructured pedestrian traffic). Once the manual labeling process is complete, the algorithm can then proceed to learn dominant motion characteristics (e.g. direction of motion along a specific road, or lack of motion on the side of the road). Alternatively, these dominant patterns can also be manually input by a camera operator, for example by pointing out the predominant direction and speed of traffic on a road lane.

In one example, search neighborhood attributes (e.g. size, orientation, etc.) are adjusted as a function of time. For instance, a search neighborhood may be smaller (e.g., five pixels) during peak traffic times (e.g. when traffic is expected to be slow and motion of a given vehicle is slower), and larger (e.g., 10 pixels) during off-peak traffic times (e.g. when traffic is expected to move rapidly and vehicle motion between frames is greater.)

In another example, search neighborhood attributes (e.g. size, orientation, etc.) are adjusted as a function of traffic conditions independent of time of day. For instance, a search neighborhood may be smaller (e.g., five pixels) for slow-moving traffic, and larger (e.g., 10 pixels) for fast-moving traffic.

It will be appreciated that the method of FIG. 1 can be implemented by a computer 30, which comprises a processor (such as the processor 204 of FIG. 9) that executes, and a memory (such as the memory 206 of FIG. 9) that stores, computer-executable instructions for providing the various functions, etc., described herein.

Figure 9:
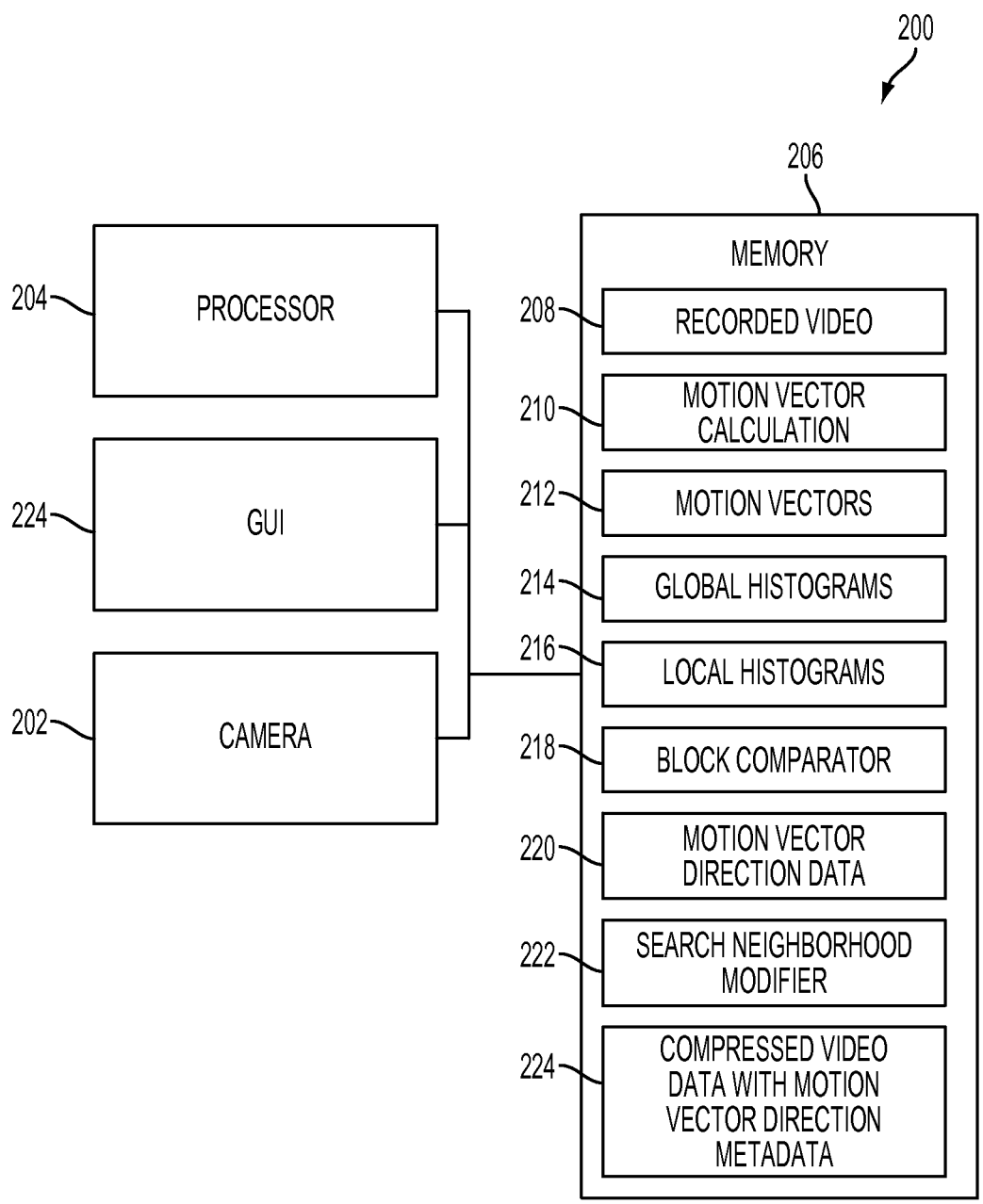
FIG. 9 illustrates a system that facilitates efficient motion compensation, in accordance with one or more aspects described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment. In one embodiment, the herein described processing is performed in the camera 31 (FIG. 2) and/or camera 202 (FIG. 9).

The computer 30 can include a processing unit (see, e.g., FIG. 9), a system memory (see, e.g., FIG. 9), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
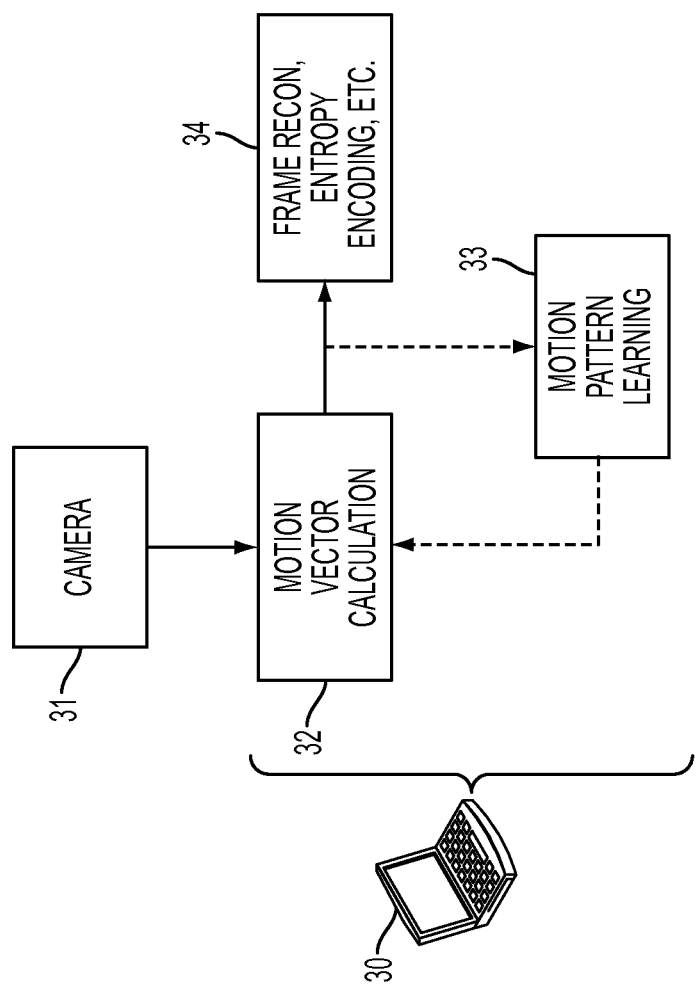
FIG. 2 illustrates a high level overview of a system performing block-based motion estimation for video compression and learning the dominant spatio-temporal characteristics of the motion patterns within the scene being captured, in accordance with one or more features described herein.

FIG. 2 illustrates a high level overview of a system for performing the method of FIG. 1, in accordance with one or more aspects described herein. The system facilitates a learning phase during which global and local (block-based) histograms of historical motion behavior are built or generated, and a motion estimation phase during which searches are performed in reduced or optimized neighborhoods of a target block according to the learned historical motion behavior patterns.

According to FIG. 2, a traffic surveillance camera 31 (or other suitable video recording device) acquires video of passing vehicles. The system further includes a motion vector calculation module 32 that determines motion vectors from the incoming live uncompressed video stream, wherein the motion vectors are of a type used for video compression.

The system further includes a motion pattern learning module 33 that performs various actions, including but not limited to those described with regard to steps 11, 12, 14, and 16 of FIG. 1. A frame reconstruction and entropy encoding module 34 reconstructs and encodes frames of the captured video to generate compressed video data.

In other embodiments, other types of camera that capture video where the predominant direction of motion can easily be extracted and learned across time may include vehicle mounted cameras (e.g. school bus, public transportation vehicles and police car dashboard cameras), in which the dominant motion characteristics are determined by the location of the camera on the vehicle as well as the motion of the vehicle itself. For example, the apparent motion captured by a side-mounted camera on a school bus will predominantly be from right to left (left to right) if the camera is mounted on the left (right) hand side of the bus. Similarly, for dashboard cameras facing forward, the predominant motion pattern will be located along radial directions originating at the so-called focus of expansion.

Figure 3A:
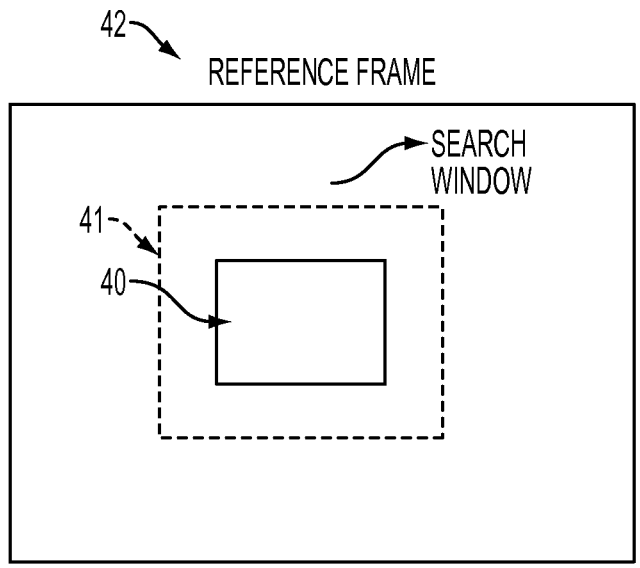
FIG. 3A shows a reference block and search neighborhood in reference frame.
Figure 3B:
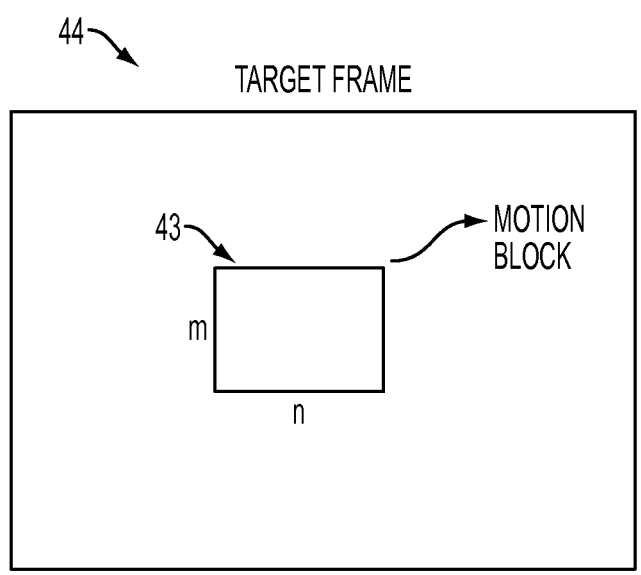
FIG. 3B shows a target block in a target frame.

FIGS. 3A and 3B depict a graphical description of a block matching algorithm. FIG. 3A shows a reference block 40 and search neighborhood 41 in reference frame 42. FIG. 3B shows a target block 43 in a target frame 44. A block matching algorithm or module executed by processor breaks up the frame to be compressed (the target frame) into pixel blocks of a predetermined size. The size of a motion block may be denoted by m×n pixels, where typically m=n=16 pixels. A search is performed by the processor in the reference frame for the block that is most similar to the current m×n target pixel block. Since searching and calculating similarity metrics is a computationally expensive process, a search neighborhood is typically defined around the location of the target motion block as shown in FIG. 3A. Examples of similarity criteria between the blocks are, e.g., the mean squared error (MSE) and the mean absolute difference (MAD), which are calculated as:

$$MSE(d_1, d_2, j) = \left(\frac{1}{mn}\right)\sum (B(k, l, j) - B(k + d_1, l + d_2, j - 1))^2 \quad (1)$$

$$MAD(d_1, d_2, j) = \left(\frac{1}{mn}\right)\sum |B(k, l, j) - B(k + d_1, l + d_2, j - 1)| \quad (2)$$

where B(k,l,j) denotes the pixel located on the k-th row and l-th column of the m'n block of pixels in the j-th frame. In this case, the (j−1)-th frame is the already encoded frame being used as a reference frame, and the j-th frame is the target frame. Since both MSE and MAD measure how dissimilar two blocks are, a block similarity measure can then be defined as the reciprocal or the negative MSE or MAD. The motion vector for the target pixel block is the vector $(d_1, d_2)$ that maximizes the block similarity measure between the target and reference blocks.

Figure 4A:
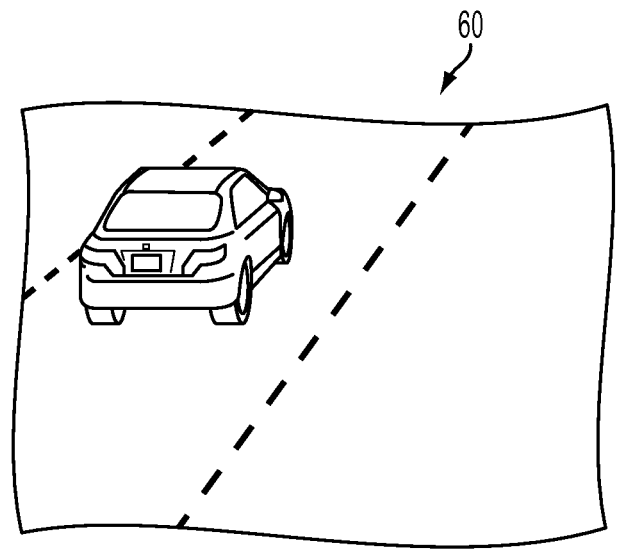
FIG. 4A shows a reference frame within a video sequence.
Figure 4B:
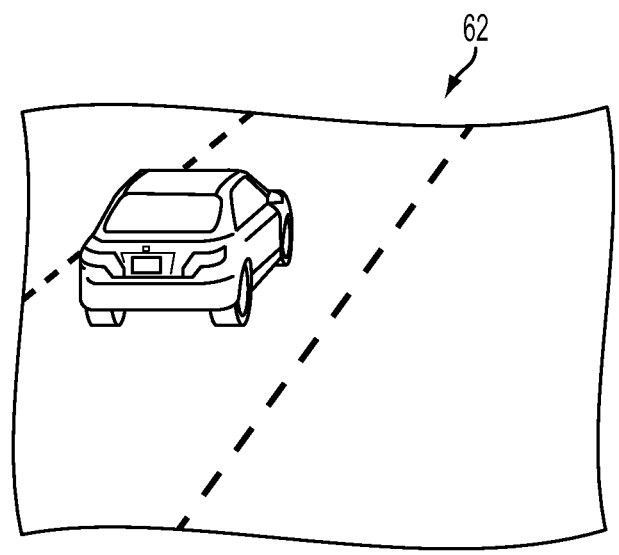
FIG. 4B shows a target frame within a video sequence.
Figure 4C:
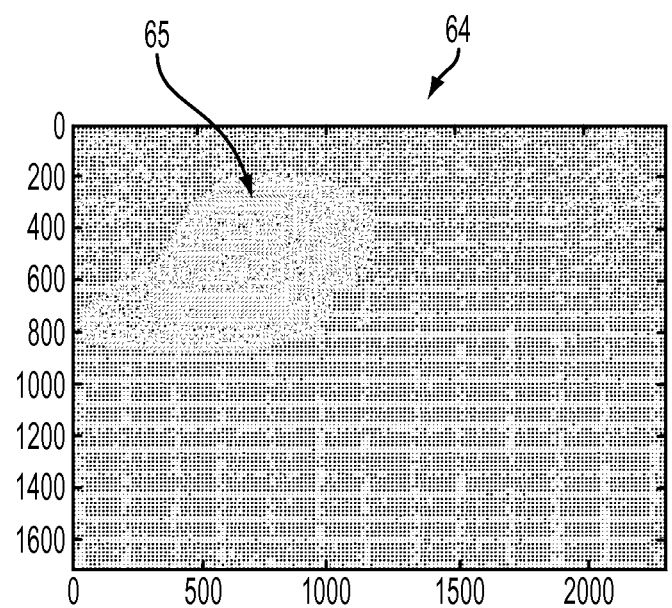
FIG. 4C shows the corresponding motion vector field.

FIGS. 4A and 4B show two 1728×2304 pixel adjacent frames: a reference frame 60 (FIG. 4A) and a target frame 62 (FIG. 4B) within a video sequence. FIG. 4C shows the corresponding 16×16 pixel motion vector field 64. The motion vector cluster 65 is a representation of motion of the vehicle in the image frame of FIG. 4A.

Figure 5A:
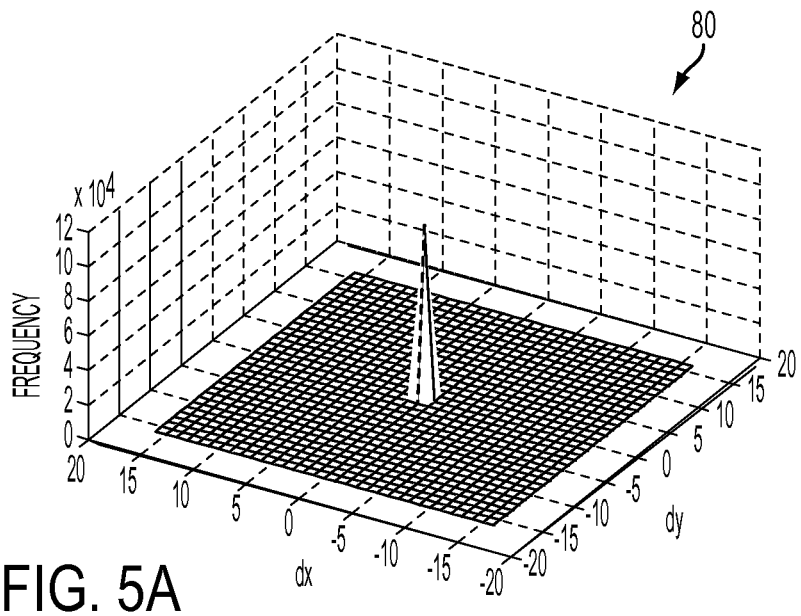
FIG. 5A illustrates a sample 2D global histogram of motion vector components resulting from the aggregation of motion estimation data across video frames.
Figure 5B:
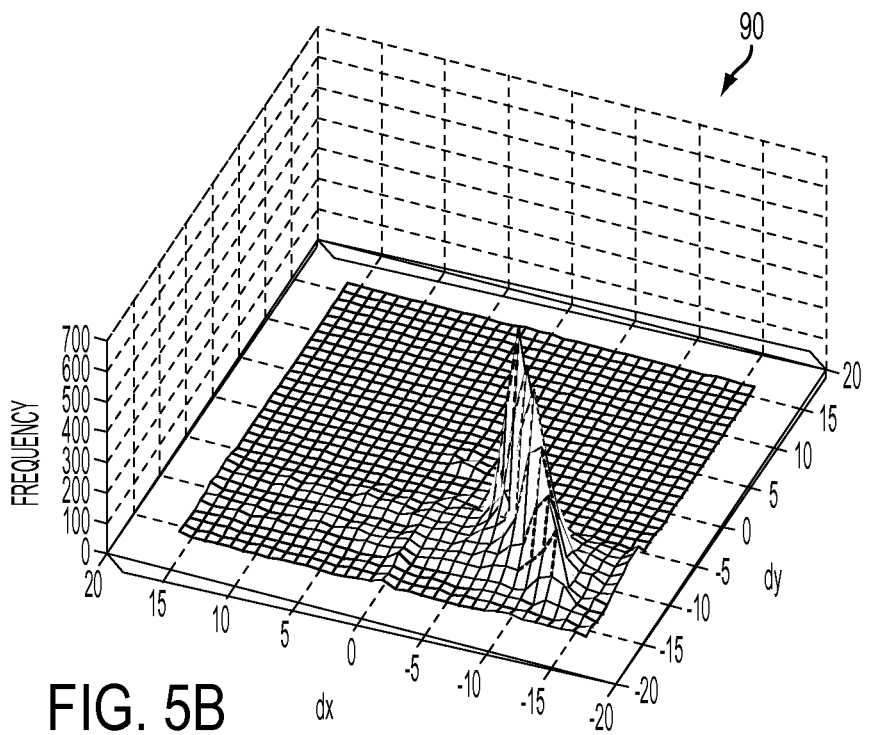
FIG. 5B illustrates a histogram generated after removal of the (0,0) entry, such as is generated when updating the global histogram.

FIG. 5A illustrates a sample 2D global histogram 80 of motion vector components resulting from the aggregation of motion estimation data across 30 video frames. FIG. 5B illustrates a histogram 90 generated from the histogram 80 (FIG. 5A) after removal of the (0,0) entry, such as is generated when updating the global histogram at 14 (FIG. 1). The histogram in FIG. 5A has a large peak at dx=0 and dy=0 (the location that corresponds to stationary blocks), implying that most of the blocks in the image remain stationary for the 30 frames analyzed. FIG. 5B shows the histogram from FIG. 5A where the histogram entry at dx=0 and dy=0 has been removed for easier visualization of non-zero motion block frequency. It can be seen that a significant majority of the motion vectors associated with non-stationary pixels are located along a diagonal region that corresponds to the direction of the traffic in the acquired video.

Figure 6A:
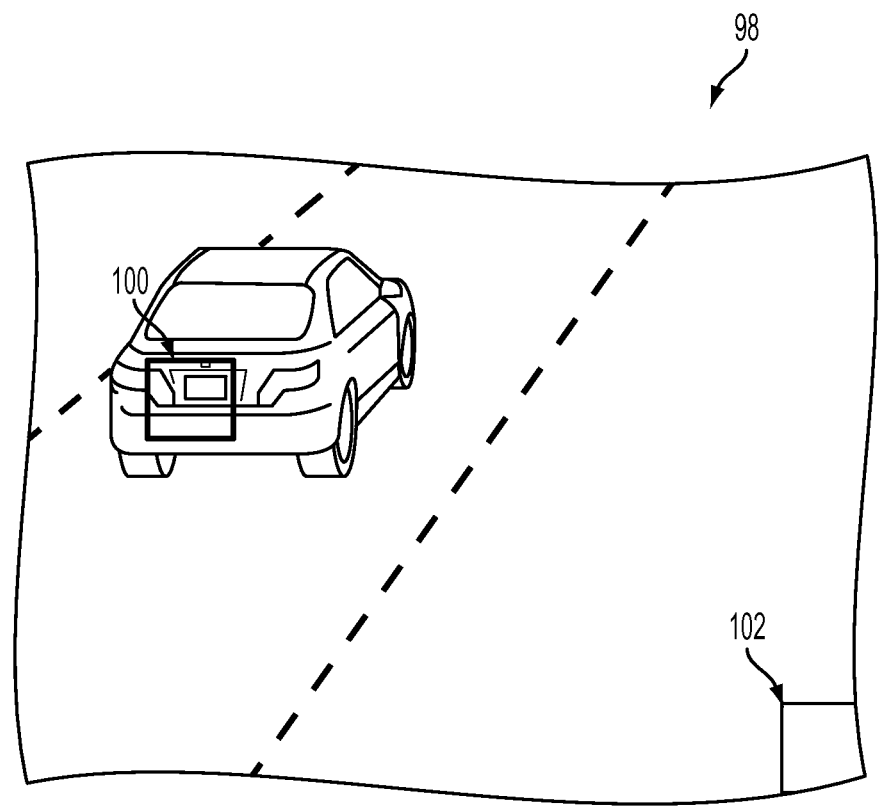
FIG. 6A shows a sample video scene with two highlighted target motion blocks one in red and one in blue.
Figure 6B:
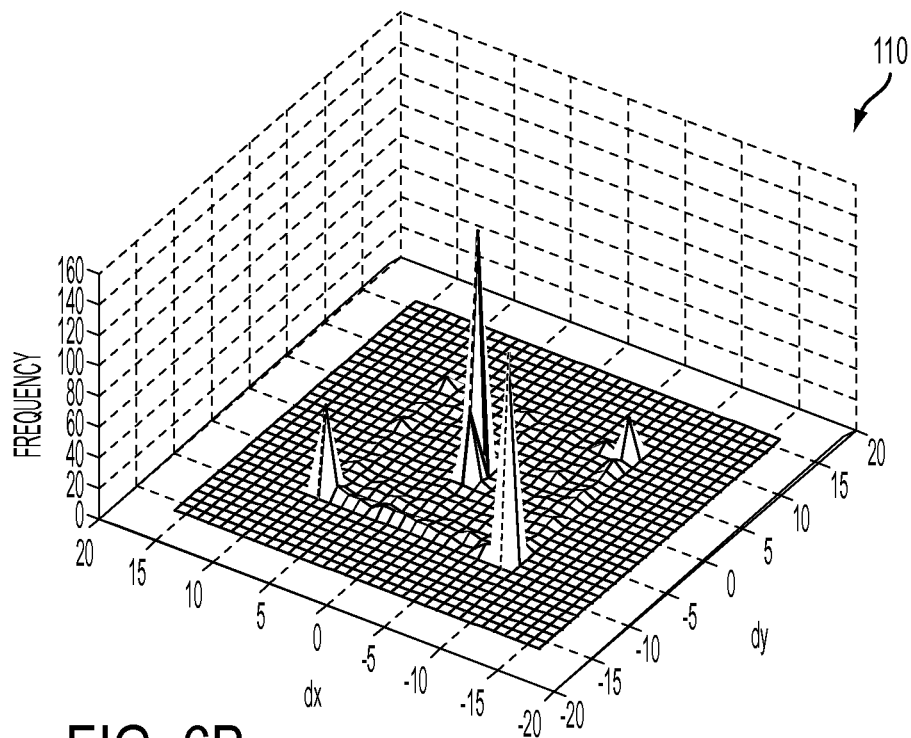
FIG. 6B shows a 2D histogram of motion vector components corresponding to the blue motion block of FIG. 6A.
Figure 6C:
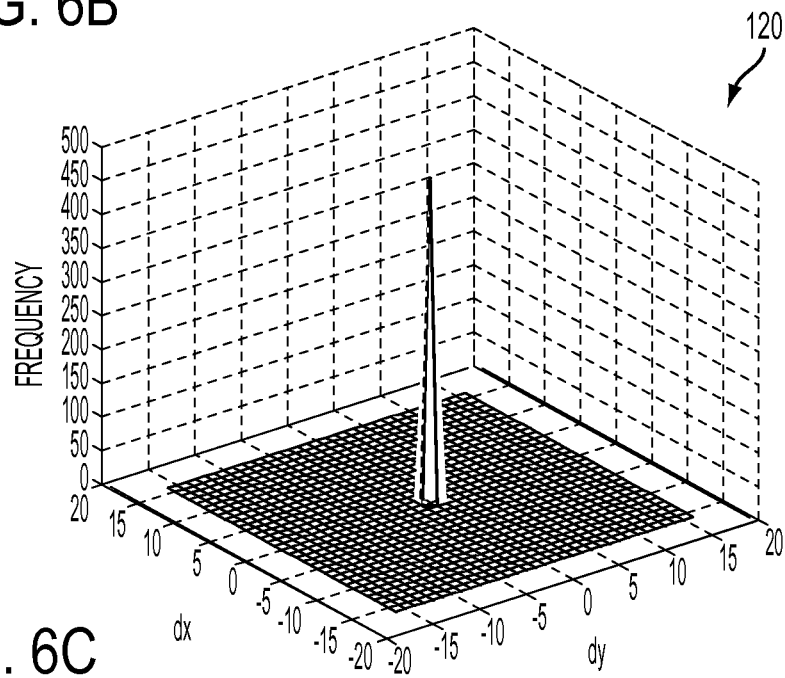
FIG. 6C shows another 2D histogram of motion vector components corresponding to the red motion block of FIG. 6A.

FIGS. 6A-6C illustrate an image frame and corresponding histograms such as are generated at 16 (FIG. 1). The presence of peaks in the global histogram, such as in the one shown in FIG. 5, indicates the existence of predominant motion patterns in the video sequence. Computation of block or block group 2D histograms aids the identification of scene regions with predominant motion patterns. FIG. 6A shows a sample video scene 98 with two highlighted target motion blocks 100, 102, one in red and one in blue. FIGS. 6B and 6C show the 2D histograms 110, 120, respectively, of the motion vector components of the regions highlighted by each of the blocks 100, 102. From inspection of FIGS. 6B and 6C, it can be seen that the motion blocks in the region highlighted by the blue outline 100 are mainly stationary (in the absence of moving vehicles) or oriented along the direction of the traffic flow, while the region highlighted by the red outline 102 is mostly stationary.

Figure 7A:
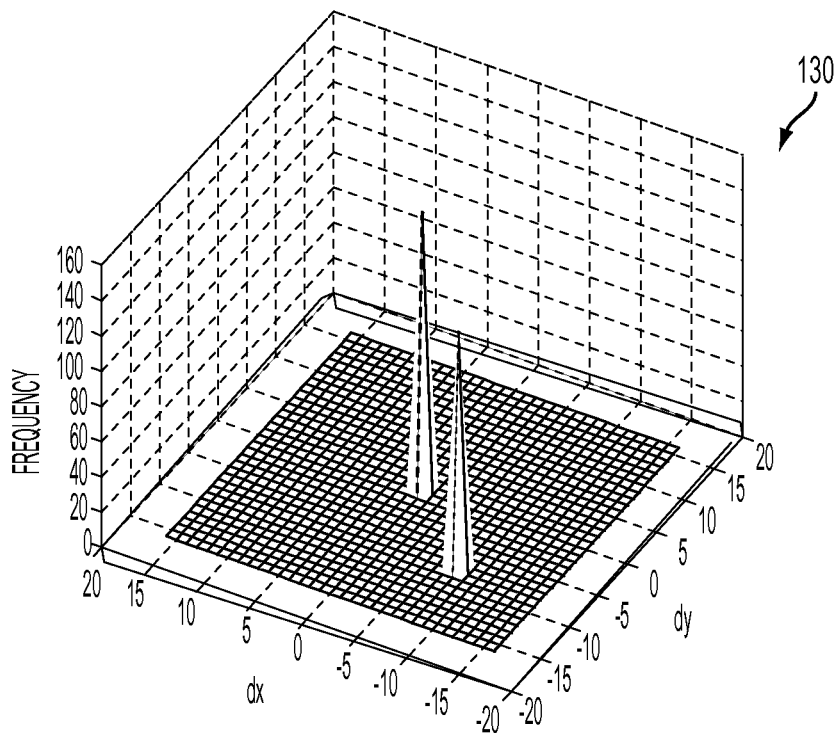
FIG. 7A illustrates a histogram to which a thresholding algorithm has been applied when determining whether a specific block or group of blocks is a candidate for efficient motion compression.
Figure 7B:
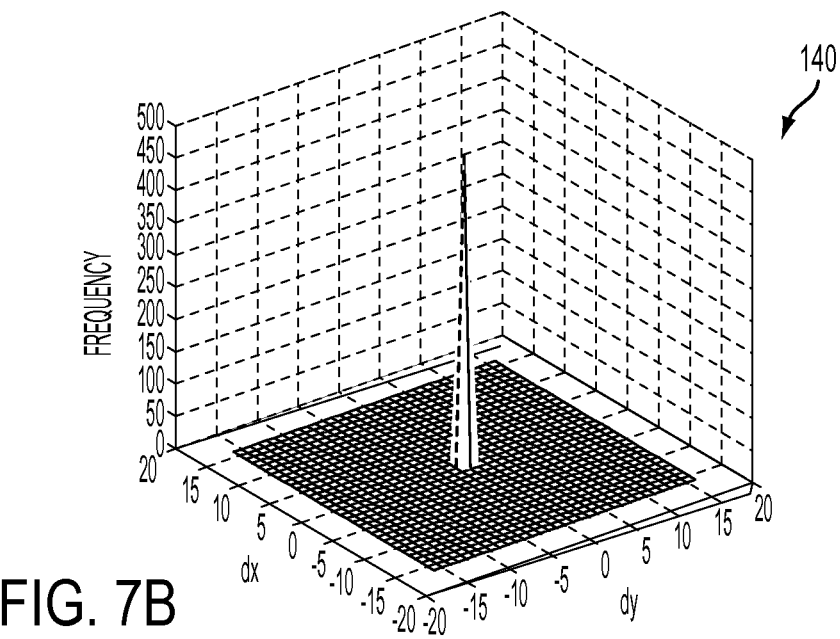
FIG. 7B illustrates another histogram to which a thresholding algorithm has been applied when determining whether a specific block or group of blocks of is a candidate for efficient motion compression.

FIGS. 7A and 7B illustrate histograms 130, 140, respectively, to which a thresholding algorithm has been applied, such as is described with regard to 18 (FIG. 1) when determining whether a specific block or group of blocks is a candidate for efficient motion compression. Candidates for efficient motion estimation can be found, for example, by performing thresholding on the histogram data (so as to eliminate the influence of outliers or fictitious motion vectors) and limiting the search regions to locations where peaks are still present after the thresholding. The value of the threshold can be used to control the degree of simplification of the search areas; for example, more aggressive thresholding will lead to a more drastic reduction in the size of the search area, and vice-versa. Other clustering and segmentation techniques can be used to determine dominant patterns of motion from the histogram data. In one example, the histograms 130, 140 represent the histograms from FIGS. 6A and 6B after a thresholding operation, where the threshold has been defined as a fraction (e.g., a factor of 0.6 or some other threshold factor) of the histogram entry at (0,0).

Figure 8A:
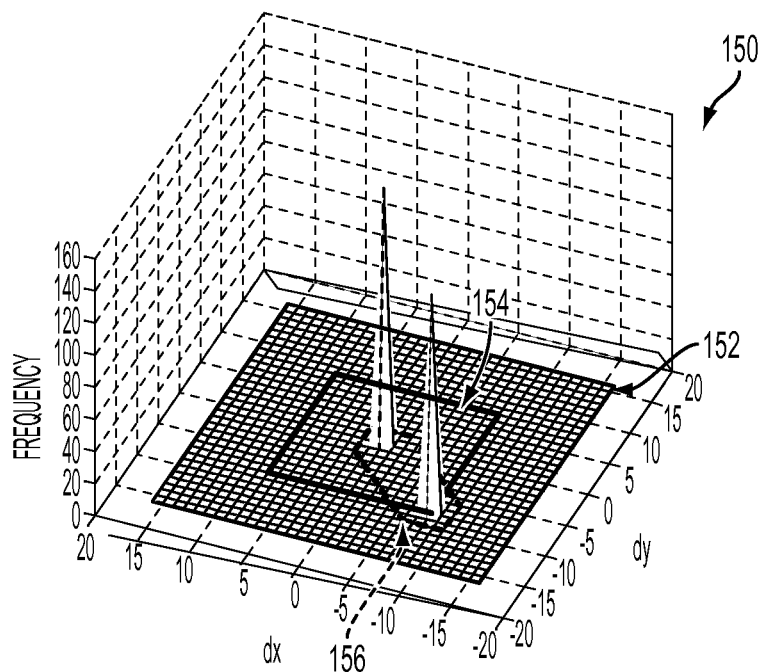
FIG. 8A illustrates a histogram that facilitates determining predominant motion directions and reduced search zones.
Figure 8B:
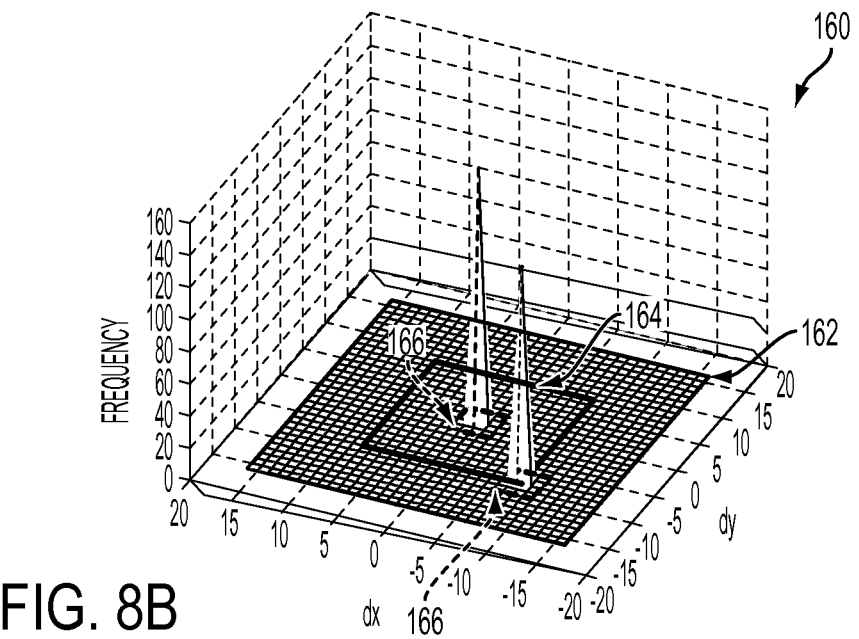
FIG. 8B illustrates another histogram that facilitates determining predominant motion directions and reduced search zones.
Figure 8C:
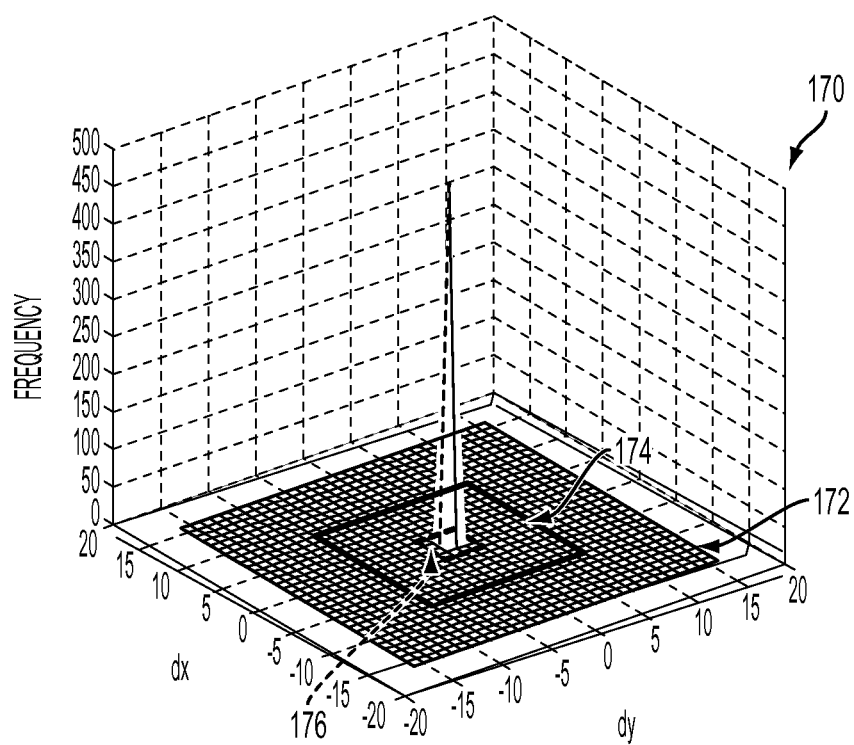
FIG. 8C illustrates another histogram that facilitates determining predominant motion directions and reduced search zones.

FIGS. 8A-8C illustrate histograms that facilitate determining predominant motion directions and reduced search zones as described with regard to 20 (FIG. 1). The locations of the histogram peaks that remain after the thresholding operation indicate predominant motion direction and magnitude at the specific block or region. This facilitates detecting and exploiting the characteristics of any predominant motion patterns that are present in the scene and limit the motion compensation search regions accordingly. In the example illustrated by FIG. 7A, which is associated with blocks located along the highway, the search region for these blocks would be limited to locations along the direction of motion of the traffic, as highlighted by the red outline in FIG. 8A. Green and yellow outlines highlighting the search regions for traditional exhaustive algorithms (±8 and ±16 pixel neighborhoods, respectively) are also included. It can be seen that the proposed search region is considerably smaller than either of the regions that are traditionally used in exhaustive algorithms. Additional computational savings would be attained if traffic moves at an approximately constant speed across the field of view, as this would constrain the radius or magnitude of search in addition to the direction of search, as illustrated by the red outline in FIG. 8B. In the case of predominantly stationary pixels, the search region would be centered at the origin, as highlighted by the red outline in FIG. 8C.

FIG. 9 illustrates a system 200 that facilitates efficient motion compensation, in accordance with one or more aspects described herein. The system is configured to perform the method(s), techniques, etc., described herein with regard to the preceding figures, and comprises a camera 202, which is coupled to a processor 204 that executes, and a memory 206 that stores computer-executable instructions for performing the various functions, methods, techniques, steps, and the like described herein. The camera 202 may be a stationary traffic surveillance camera, or a camera mounted on a vehicle such as a police cruiser or emergency response vehicle, or any other suitable camera for recording video. The processor 204 and memory 206 may be integral to each other or remote but operably coupled to each other. In another embodiment, the processor and memory reside in a computer (e.g., the computer 30 of FIG. 1) that is operably coupled to the camera 202.

As stated above, the system 200 comprises the processor 204 that executes, and the memory 206 that stores one or more computer-executable modules (e.g., programs, computer-executable instructions, etc.) for performing the various functions, methods, procedures, etc., described herein. "Module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

Recorded video 208 captured by the camera 202 stored in the memory 26. Additionally or alternatively, video that has been captured and compressed by the camera 202 can be received and stored in the memory 206 for analysis by the processor 204. For instance, a conventional traffic camera or other video camera may be used for capturing live video. Additionally or alternatively Internet protocol (IP) cameras may also be employed, which perform embedded video compression prior to transmission. Alternatively, compressed video may be available from a video database (not shown) where video sequences from surveillance cameras are stored.

The motion vector calculation module to 210, which may be part of a video compression module or the like, is executed by the processor to calculate motion vectors 212 from the incoming, live uncompressed video stream, where the vectors are the type used for video compression. The memory additionally stores one or more global histograms to 214 and one or more local histograms to 216 as well as a block comparator to 218 is executed by the processor to threshold blocks or groups of blocks within a frame (which has been segmented into a plurality of pixel blocks) to determine whether or not a block or block group is a candidate for efficient motion compensation, as described with regard to the preceding figures. That is, for every block (or block group) in the target frame, a determination is made whether the block or block group is a candidate for efficient motion compensation from the labels assigned by the learning stage (FIG. 1). When determining candidacy for efficient motion compensation, the comparator and/or the processor can employ one or more of historical data, manually input data, and a priori information. If a given block or block group is not a candidate, then a traditional block matching algorithm can be performed and, optionally, histogram monitoring can be continued to detect a presence of predominant motion characteristics. If the block or block group is a candidate for efficient motion compensation as determined by the comparator 218, then a local 2D histogram 216 of motion vector components of the target block (or block group) processed and predominant motion vector directions are determined.

Motion vector direction data 220 is generated from the motion vectors 212 and stored in the memory. The processor executes a search neighborhood modifier module 222 that modifies or optimizes neighborhood size, shape and orientation to perform block matching along predominant directions. That is, the processor executes a block-matching search on a modified search neighborhood. Compressed video data potentially with motion vector direction metadata 224 is then stored in the memory 206.

In another embodiment, one or more of motion vector plots, histograms, video data, or the like is displayed graphically on a graphical user interface 224 that may be integral to the system, remote but operably coupled thereto, or may reside on a computer such as the computer 30 of FIG. 1.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for performing motion estimation to compress video frames using at least one optimized search neighborhood, comprising:
   segmenting a target frame into target pixel blocks;
   determining whether each of the one or more target blocks is a candidate for efficient motion compensation; and
   for those target blocks deemed to be candidates for efficient motion estimation, optimizing the search neighborhood and performing a block-matching search on said optimized search neighborhood;
   wherein at frame n and for every target block k, if n≥N, where N is a predetermined threshold that determines the length of a learning period, and the local 2D histogram is clustered, the block k is labeled as a candidate for efficient motion compensation.

2. The method of claim 1 wherein at least one of the determining candidate blocks and the modifying of the candidate search neighborhood are done using at least one of historical data, manually input data, and a priori information.

3. The method of claim 2 wherein the historical information is established by:
   computing and updating a global 2-D histogram of motion vector components;
   for each of one or more target blocks, computing and updating a local 2-D histogram; and
   determining predominant motion vector directions from analysis of the local and global 2-D histograms.

4. The method of claim 1, wherein the search neighborhood attributes comprise at least one of search neighborhood size and search neighborhood shape.

5. The method of claim 1, wherein the search neighborhood attributes are adjusted as a function of at least one of time and traffic speed.

6. The method of claim 5, wherein the search neighborhood is smaller during peak traffic hours than during off-peak traffic hours.

7. The method of claim 5, wherein the search neighborhood is smaller for slow-moving traffic and larger for fast-moving traffic.

8. The method of claim 1, wherein determining whether each of the one or more target blocks is a candidate for efficient motion compensation comprises:
  learning historical patterns of behavior of global and local motion; and
  wherein the method further comprises searching along predominant motion vectors.

9. The method according to claim 1, wherein the determining whether each of the one or more target blocks is a candidate for efficient motion compensation comprises at least one of:
  manually identifying the candidate target blocks;
  receiving pre-labeled candidate block information; and
  analyzing a histogram of historical motion data.

10. The method according to claim 1, wherein the optimizing of the search neighborhood comprises:
  determining predominant motion characteristics from properties of the historical motion data; and
  limiting the search to predominant motion neighborhoods.

11. The method according to claim 1, wherein the global histogram is updated at frame n, $H_n(dx,dy)$ via an auto-regressive moving average computation such that:

$$H_n(dx,dy)=\alpha h_n(dx,dy)+(1-\alpha)H_{n-1}(dx,dy)$$

where $\alpha$ is a constant such that $0 \leq \alpha \leq 1$ and $h_n(dx,dy)$ is the motion vector histogram of frame n.

12. The method according to claim 1, wherein at frame n and for every target block k, the local 2D histogram $H_{nk}(dx,dy)$ of the motion vector components dx and dy based on $H_{n-1k}(dx,dy)$ and $h_{nk}(dx,dy)$ is updated via an auto-regressive moving average computation such that:

$$H_{nk}(dx,dy)=\alpha h_{nk}(dx,dy)+(1-\alpha)H_{n-1k}(dx,dy)$$

where $\alpha$ is a constant such that $0 \leq \alpha \leq 1$.

13. A processor configured to execute computer-executable instructions for performing the method of claim 1, the instructions being stored on a non-transitory computer-readable medium.

14. A system that facilitates motion estimation for compression of video frames using at least one optimized search neighborhood, comprising:
  a camera that captures video of a moving object; and
  a processor configured to:
    segment a target frame into target pixel blocks;
    determine whether each of the one or more target blocks is a candidate for efficient motion compensation;
    for those target blocks deemed to be candidates for efficient motion estimation, optimizing the search neighborhood and performing a block-matching search on the optimized search neighborhood;
    wherein at frame n and for every target block k, if n≥N, where N is a predetermined threshold that determines the length of a learning period, and the local 2D histogram is clustered, the block k is labeled as a candidate for efficient motion compensation.

15. The system according to claim 14, wherein when performing at least one of determining candidate blocks and modifying the candidate search neighborhood, the processor is further configured to use at least one of historical data, manually input data, and a priori information.

16. The system of claim 14, wherein the processor is further configured to:
  compute and update a global 2-D histogram of motion vector components;
  for each of one or more target blocks, compute and update a local 2-D histogram;
  determine predominant motion vector directions from analysis of the local and global 2-D histograms.

17. The system of claim 14, wherein the search neighborhood attributes comprise at least one of search neighborhood size and search neighborhood shape.

18. The system of claim 14, wherein the search neighborhood attributes are adjusted as a function of one of time and traffic speed.

19. The system of claim 18, wherein the search neighborhood is smaller during peak traffic hours than during off-peak traffic hours.

20. The system of claim 18, wherein the search neighborhood is smaller for slow-moving traffic and larger for fast-moving traffic.

21. The system of claim 14, wherein when determining whether each of the one or more target blocks is a candidate for efficient motion compensation, the processor is further configured to:
  learn historical patterns of behavior of global and local motion; and
  wherein the processor is further configured to search along predominant motion vectors.

22. The system according to claim 14, wherein when determining whether each of the one or more target blocks is a candidate for efficient motion compensation, the processor is further configured to at least one of:
  manually identify the candidate target blocks; and
  receive pre-labeled candidate block information; and
  analyze a histogram of historical motion data.

23. The system according to claim 14, wherein the global histogram is updated at frame n, $H_n(dx,dy)$ via an auto-regressive moving average computation such that:

$$H_n(dx,dy)=\alpha h_n(dx,dy)+(1-\alpha)H_{n-1}(dx,dy)$$

where $\alpha$ is a constant such that $0 \leq \alpha \leq 1$, and $h_n(dx,dy)$ is the motion vector histogram of frame n.

24. The system according to claim 14, wherein at frame n and for every target block k, the local 2D histogram $H_{nk}(dx,dy)$ of the motion vector components dx and dy based on $H_{n-1k}(dx,dy)$ and $h_{nk}(dx,dy)$ is updated via an auto-regressive moving average computation such that:

$$H_{nk}(dx,dy)=\alpha h_{nk}(dx,dy)+(1-\alpha)H_{n-1k}(dx,dy)$$

where $\alpha$ is a constant such that $0 \leq \alpha \leq 1$.

25. A non-transitory computer-readable medium having stored thereon computer-executable instructions for performing motion estimation for compression of video frames using at least one optimized search neighborhood, the instructions comprising:
  segmenting a target frame into target pixel blocks;
  determining whether each of the one or more target blocks is a candidate for efficient motion compensation; and
  for those target blocks deemed to be candidates for efficient motion estimation, optimizing the search neighborhood and performing a block-matching search on the optimized search neighborhood;
  wherein at frame n and for every target block k, if n≥N, where N is a predetermined threshold that determines the length of a learning period, and the local 2D histogram is clustered, the block k is labeled as a candidate for efficient motion compensation.

26. The non-transitory computer-readable medium of claim 25, the instructions further comprising:
  computing and updating a global 2-D histogram of motion vector components;
  for each of one or more target blocks, computing and updating a local 2-D histogram; and determining predominant motion vector directions from analysis of the local and global 2-D histograms.

* * * * *